US005540447A

United States Patent [19]
Shultz et al.

[11] Patent Number: 5,540,447
[45] Date of Patent: Jul. 30, 1996

[54] PRESSURE DAMPER DIVERGING LABYRINTH SEALS WITH CIRCUMFERENTIAL PARTITIONS, AND METHOD OF SEALING

[75] Inventors: Richard R. Shultz, Groton, Conn.; John M. Vance, Bryan, Tex.

[73] Assignee: The Texas A&M University System, College Station, Tex.

[21] Appl. No.: 310,217

[22] Filed: Sep. 21, 1994

Related U.S. Application Data

[63] Continuation of Ser. No. 2,336, Jan. 8, 1993, abandoned.
[51] Int. Cl.$^6$ .......................... F16J 15/447; E21B 33/00
[52] U.S. Cl. .................... 277/1; 277/3; 277/53; 415/174.5
[58] Field of Search ............................. 277/1, 53–56, 277/3; 415/173.5, 174.5

[56] References Cited

U.S. PATENT DOCUMENTS

| | | | |
|---|---|---|---|
| 3,957,274 | 5/1976 | Lang | 277/53 X |
| 4,370,094 | 1/1983 | Ambrosch et al. | |
| 4,411,437 | 10/1983 | Conti | 277/53 |
| 4,979,755 | 12/1990 | Lebreton | 277/53 X |
| 5,088,889 | 2/1992 | Wolff | 277/53 X |
| 5,106,104 | 4/1992 | Atkinson et al. | 277/53 X |

FOREIGN PATENT DOCUMENTS

| | | | |
|---|---|---|---|
| 28259 | 2/1925 | France | 277/53 |
| 10134 | 1/1980 | Japan | 277/53 |
| 1379552 | 3/1988 | U.S.S.R. | 277/53 |
| 1569485 | 6/1990 | U.S.S.R. | 277/53 |
| 280897 | 6/1928 | United Kingdom | 277/53 |
| 705444 | 3/1954 | United Kingdom | 277/53 |

OTHER PUBLICATIONS

J. M. Vance, "Rotordynamics of Turbomachinery," *A Wiley–Interscience Publication*, Copyright 1988, pp. iii–xii and 254–260.

J. M. Lund, "Stability and Damped Critical Speeds of a Flexible Rotor in Fluid–Film Bearings" *Journal of Engineering for Industry*, May 1974, pp. 509–517.

M. Kurohashi, et al., "Spring and Damping Coefficients of the Labyrinth Seals," Paper No. C283/80, *Proceedings of the 2nd International Conference on Vibrations in Rotating Machinery* (*Institution of Mechanical Engineers*), held at Churchill College, Cambridge University, Sep. 1–4, 1980, pp. 215–222.

J. M. Vance, et al., "Effect of Labyrinth Seals on Rotordynamics of Turbomachinery" TRC Progress Report, TRC–Seals–6–85, Nov. 1985.

B. T. Murphy and J. M. Vance, PhD, "Labyrinth Seal Effects on Rotor Whirl Instability", #C306/80 published in the *Proceeding of the Second International Conference on Vibrations in Rotating Machinery*, Cambridge, England, Sep. 2–4, 1980.

J. S. Alford, "Protecting Turbomachinery from Self–Excited Rotor Whirl", *Journal of Engineering for Power*, ASME Transactions, Oct. 1965, pp. 333–344.

J. M. Vance, et al., "Effect of Straight Through Labyrinth Seals on Rotordynamics," Vance, Zierer and Conway, pp. 1–13. (no date given).

(List continued on next page.)

*Primary Examiner*—Scott W. Cummings
*Attorney, Agent, or Firm*—Baker & Botts, L.L.P.

[57] ABSTRACT

A damper seal (10) and method of sealing and damping a rotating shaft (12) is provided with a stator housing (14) and at least two sealing blades, an upstream sealing blade (16) and a downstream sealing blade (18). There are at least two partitioning walls (20) disposed between the sealing blades (16,18) and attached to the stator housing (14). The clearance between the downstream sealing blade (18) and the shaft (12) is greater than the clearance between the upstream sealing blade (16) and the shaft (12). The damper seal (10) restricts the flow of fluid from regions along the shaft that are at different pressures and damps vibratory or whirl motion of the shaft.

17 Claims, 2 Drawing Sheets

OTHER PUBLICATIONS

Joseph J. Zierer, Jr., "Effect of a Straight Teeth–on–Rotor Labyrinth Seal on Rotordynamics," Thesis submitted to the Office of Graduate Studies of Texas A&M University, Dec. 1991.

Eileen M. Conway, "The Effect of Teeth–on–Stator Labyrinth Seals on Rotor Imbalance Response," Thesis submitted to the Office of Graduate Studies of Texas A&M University, Aug. 1991.

George L. von Pragenau, "From Labyrinth Seals to Damping Seals/Bearings", Fourth International Symposium on Transport Phenomena and Dynamics of Rotating Machinery (ISROMAC–4), vol. A, Apr. 5–8, 1992, pp. 277–285.

J. M. Vance and J. L. Nikolajsen, Proposal entitled "Dampers for Advanced Engines" submitted by the Texas A&M Research Foundation to General Electric, Mar. 1988.

J. M. Vance, Progress report to General Electric on "Gas Damper", Oct. 1990.

PRESSURE DAMPER DIVERGING LABYRINTH SEALS WITH CIRCUMFERENTIAL PARTITIONS, AND METHOD OF SEALING

The U.S. Government has a paid-up license in this invention and the right in limited circumstances to require the patent owner to license others on reasonable terms as provided for by the terms of the Air Force Research in Aeropropulsion Technology (AFRAPT) program.

CROSS REFERENCE TO RELATED APPLICATIONS

This application is a continuation of application Ser. No. 08/002,336 filed Jan. 8, 1993, entitled "PRESSURE DAMPER SEALS" by John M. Vance and Richard R. Shultz, now abandoned.

TECHNICAL FIELD OF THE INVENTION

This invention relates to rotary shaft seals, and more particularly to pressure damper seals for restricting fluid flow between segments of a rotating shaft that are at different pressure levels while damping vibratory motion of the shaft.

BACKGROUND OF THE INVENTION

Various sealing and damping systems are used with rotating machinery, e.g., turbojet engines, steam turbines, gas turbines, compressors, and pumps, to prevent fluids under pressure from leaking along a shaft in the rotating equipment and to minimize vibratory motion of the shaft. Such systems frequently include labyrinth seals and squeeze film dampers.

Squeeze film dampers are frequently used with rotating equipment that utilize ball bearings. Squeeze film dampers use an oil film contained in a loose clearance space provided around the outer race of the ball bearing elements. The oil provides a hydrodynamic, viscous action that generates pressure in the oil film that opposes vibratory motion and dissipates vibratory energy of a rotating shaft. Squeeze film dampers have a disadvantage in that they may only be placed where the bearing elements are located on the shaft, and typically the vibration amplitude is relatively small at the location of the bearing elements. Another disadvantage of squeeze film dampers is their temperature limitation; squeeze film dampers are less effective at higher temperatures due to the temperature limitations of the working oil fluid.

Labyrinth seals are frequently used in rotating machinery to maintain a pressure differential between two adjacent portions on the exterior of a shaft. For example, labyrinth seals may be found in turbojet aircraft engines at each of the numerous turbine wheels along the longitudinal axis of the engine's shaft. There are numerous variations on labyrinth seals, but the typical labyrinth seal consists of a series of circular lands and annular grooves that present a tortuous flow path to the fluid. The lands and grooves of the typical labyrinth seal cooperate to provide minimum leakage while allowing radial or axial clearance between the shaft and associated stator or housing. While the labyrinth seal provides minimum leakage, the seal does not provide substantial damping of vibratory motion of the rotating shaft.

Another type of seal used to limit leakage of fluid between regions at different pressures along a shaft is the honeycomb seal. Honeycomb seals are frequently used in pumps and other types of rotating equipment employing incompressible fluids. Honeycomb seals typically utilize a stator with hexagonal cells lining the internal surface of the stator. The inner surface of the honeycomb-stator surrounds the shaft with a small clearance. The cells function to resist the flow of fluid past the cells. While there is some evidence that honeycomb-stator seals are more stabilizing than labyrinths seals in terms of vibration, honeycomb seals have the disadvantage of sometimes being damaged by high pressure drops.

Another problem experienced with rotating shafts and often caused by conventional seals is rotordynamic instability caused by cross-coupling due to fluid flow patterns around the shaft. In attempting to correct this problem, some manufacturers have added vanes upstream of a shaft seal that impose a fluid swirl opposite to the swirl induced by shaft rotation. This latter technique requires additional components which add weight to the overall system and can induce backward whirl of the rotor in certain speed ranges. Extra weight can be an undesirable, limiting factor in some situations, such as in turbojet engines. Thus, a need has arisen for a seal that prevents or greatly reduces fluid swirl about a rotating shaft while not requiring additional parts or components that add weight to the seal and are likely to cause more maintenance problems.

The performance goal for the next-generation aircraft engine is to double the thrust to weight ratio of present day engines. This will be achieved with increased operating temperatures and reduced weight. The increased operating temperatures will probably preclude the use of squeeze film dampers as damping devices. It is also desirable to reduce the vibration of the rotating shaft of jet engines for several reasons: (1) bearing life is increased by reducing the vibration; (2) reducing the vibration allows the blades to be placed with smaller clearances and thereby allows for greater efficiency; and (3) reducing the vibration reduces the noise of the engine because the noise associated with a jet engine is generally proportional to the amplitude of the vibrating shaft. The effectiveness of using squeeze film dampers is limited because the dampers may only be placed where bearing elements are located along the shaft. Labyrinth and honeycomb seals are not very effective for reducing the vibratory motion of the shaft.

Thus, a need has arisen for an apparatus and method for damping vibration of a rotating shaft under high temperatures and at locations that may be away from bearing elements. Furthermore, it would be advantageous to have a method and an apparatus that could seal as well as damp under these conditions. A similar need has arisen in other areas involving rotating machinery, such as steam turbines, gas turbines, compressors, and pumps.

SUMMARY OF THE INVENTION

In accordance with the present invention, the disadvantages and problems associated with previously developed dampers and seals have been substantially reduced or eliminated by use of the present damper seal invention.

A stator housing, or non-rotating collar, is placed over the area of a rotating shaft to be sealed and dampened. At least one pair of sealing blades, an upstream and a downstream sealing blade, are attached to the stator housing so as to have a specified radial clearance with respect to the rotating shaft for each sealing blade. The upstream sealing blade has a smaller clearance than the downstream sealing blade. Two or more partitioning walls are attached to the sealing blades and stator housing between the upstream and downstream sealing blades.

The present invention has significant technical advantages in that a damper seal is provided to effectively damp the vibration of a rotating shaft at any point along the shaft where a conventional seal might be located, whether or not a bearing is located there. This is advantageous since the amplitude of vibration is frequently the greatest at points distant from bearing locations. Additionally, the present invention can operate at high temperatures. This latter advantage is significant because many future rotating shaft designs will most likely have high operating temperatures.

Yet another significant technical advantage of the damper seal of the present invention is that it eliminates or greatly reduces fluid swirl about the shaft. This aspect of the present invention operates to prevent or reduce cross-coupling and the instability (rotordynamic instability) associated therewith.

The present invention has another significant advantage in that a damper seal is provided that seals adjacent regions of differing pressures along a rotating shaft while also damping vibration of the shaft.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
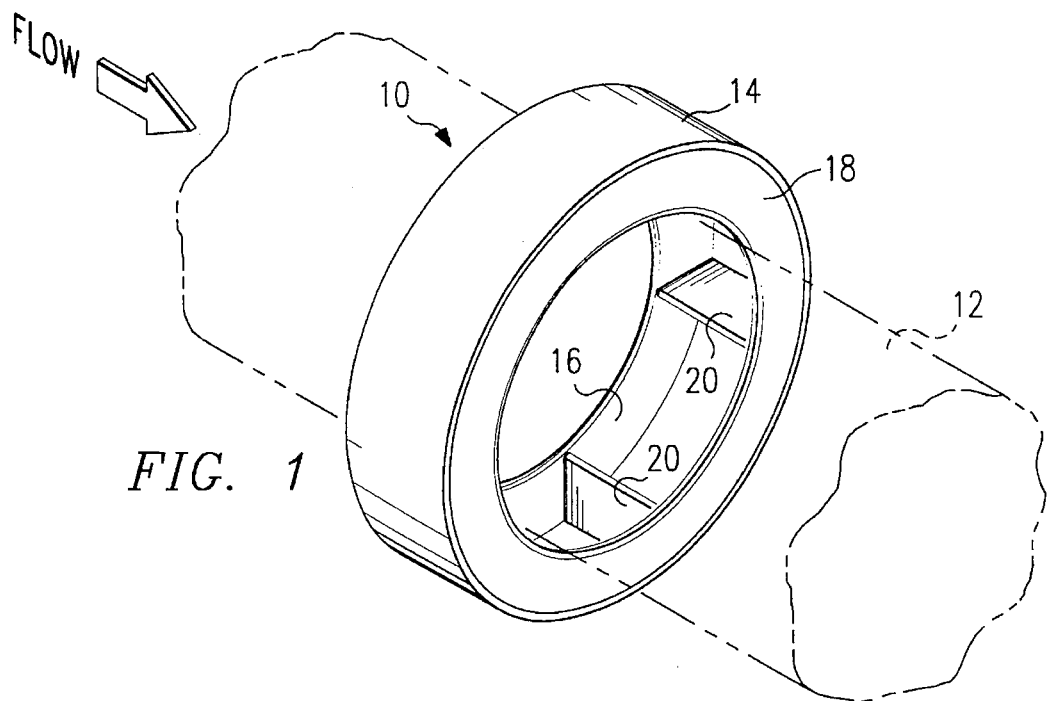
FIG. 1 is a perspective view of one embodiment of the present invention.

Referring to FIG. 1, damper seal 10 is shown on the exterior of shaft 12. Damper seal 10 may be used with various types of rotating machinery such as turbine generators, turbojet engines, compressors and pumps (not shown). The damper seal 10 functions to seal or restrict the flow of fluid from a region upstream from the seal 10 to a region downstream from the seal 10 and to damp vibratory motion, or whirl, of the shaft 12.

In accordance with one embodiment of the present invention and as shown in FIG. 1, damper seal 10 comprises a set of sealing blades 16 and 18 which are attached to stator housing or non-rotating collar 14 and which extend inwardly toward shaft 12. Sealing blades 16 and 18 have the general configuration of annular disks with openings through which rotating shaft 12 extends. One of the sealing blades, the upstream sealing blade 16, is located upstream in the fluid flow from the other blade, downstream sealing blade 18.

A plurality of partitioning walls or segregating walls 20 are positioned longitudinally between sealing blade 16 and sealing blade 18 on the interior of stator housing 14. Partitioning walls 20 are attached longitudinally to stator housing 14 and perpendicular to sealing blades 16 and 18 and perpendicular to a tangent line about the annular stator housing 14 at the point of contact between the stator 14 and partitioning walls 20. Other embodiments may have partitioning walls 20 attached in like manner without being perpendicular to the tangent line about the stator housing 14, i.e., attached at an angle. Partitioning walls 20 perform several important functions within damper seal 10. Partitioning walls 20 provide structural support to prevent longitudinal movement or flexing of sealing blades 16 and 18 relative to rotating shaft 12. As will be explained later in more detail, partitioning walls 20 also divide the interior of damping seal 10 into a plurality of fluid cavities. Each fluid cavity is defined in part by its associated partitioning wall 20, sealing blades 16 and 18, the exterior of rotating shaft 12 adjacent to damper seal 10, and the interior of stator housing 14.

Figure 2A:
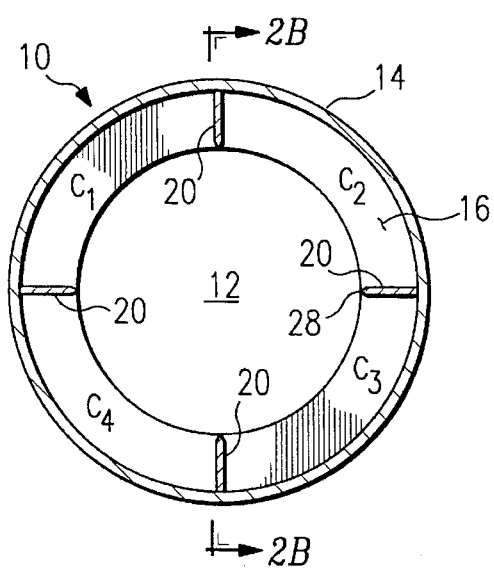
FIG. 2A is radial section of one embodiment of the present invention taken at the center of the stator housing.

Referring now to FIG. 2A, there is shown a radial section of the embodiment of FIG. 1 taken about the center of the stator housing 14. In accordance with FIG. 2A, four partitioning walls 20 have been evenly distributed about the inner circumference of stator housing 14. The partitioning walls 20 function to separate the cavities $C_1$, $C_2$, $C_3$, and $C_4$.

Figure 2B:
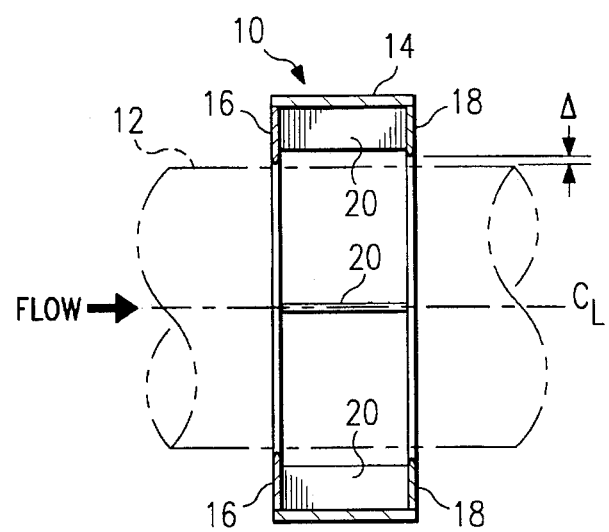
FIG. 2B is a longitudinal section of one embodiment of the present invention taken just off the center of the longitudinal axis of the shaft and stator housing (FIG. 2B is a section view taken along the section lines 2B—2B of FIG. 2A)

Referring now to FIG. 2B, the upstream sealing blade 16 is attached to stator housing 14 so that there exists a first predetermined clearance between the edge of upstream sealing blade 16 and the shaft 12. Likewise, the downstream sealing blade 18 is attached to the stator housing 14 to create a second predetermined clearance. The clearance of the edge of downstream sealing blade 18 and the shaft 12 is greater than the clearance of the edge of upstream sealing blade 16 and the shaft 12 (the difference in clearances is designated by a), e.g., the clearance between sealing blade 18 and shaft 12 may be twice the clearance of sealing blade 16 and shaft 12. The predetermined clearances are sized to provide a sealing effect similar to conventional labyrinth seals. The partitioning walls 20 are attached to the sealing blades 16 and 18 by welding or the like so that the partitioning walls 20 have the same clearance between the walls 20 and the shaft 12 as the downstream sealing blade 18. This latter arrangement is more clearly shown in FIG. 3, which is an exploded schematic representation of a portion of the damper seal 10 as shown in FIG. 2B.

The damper seal 10 operates to restrict the flow of fluid from upstream the damper seal to downstream the damper seal and thereby maintains a pressure differential between the two regions. Sealing is accomplished by the sealing blades 16 and 18 forming a tortuous path for the flow of the fluid. Additionally, the damper seal 10 operates to damp any vibratory motion.

The damper seal 10 uses pressure differentials to create forces that damp the whirling, rotating shaft 12. Referring again to FIG. 2A, assume a counter-clockwise rotation of a whirling shaft 12, i.e., a shaft 12 having a rotating orbit with less than a perfect circular shape. Consider the shaft 12 at a reference point 28 located at the three o'clock position on the circumference of the shaft 12. The whirl is counter-clockwise and thus the shaft 12 is moving up, and the displacement of the shaft is toward reference point 28. As the shaft moves upward, the clearances of the sealing blades 16 and 18 located adjacent to cavities $C_4$ and $C_3$ are increasing or opening up, and the clearances of the sealing blades 16 and 18 adjacent to cavities $C_1$ and $C_2$ are decreasing or closing.

Referring now to FIG. 2B, one may visualize that as the shaft 12 is displaced in one direction, the percent rate of change of the clearance between the shaft 12 and the upstream sealing blade 16 is different than the percent rate of change in the clearance between the shaft 12 and the downstream sealing blade 18 because of the difference in clearances, a. Thus, pressure in the cavities $C_1$, $C_2$, $C_3$, and $C_4$ will vary as a function of the shaft displacement and at the same frequency as the shaft whirl. The design is such that the dynamic pressure in the cavities $C_1$, $C_2$, $C_3$, and $C_4$ leads the whirl displacement vector by a phase angle of approximately 90 degrees, and thus a net force is developed by the pressure differences of the cavities $C_1$, $C_2$, $C_3$, and $C_4$ that substantially opposes the instantaneous velocity vector of the whirling shaft. In the given example, a net force would be produced by cavities $C_1$, $C_2$, $C_3$, and $C_4$ that opposes the velocity of the whirl, which would be vertical at the described moment.

Figure 3:
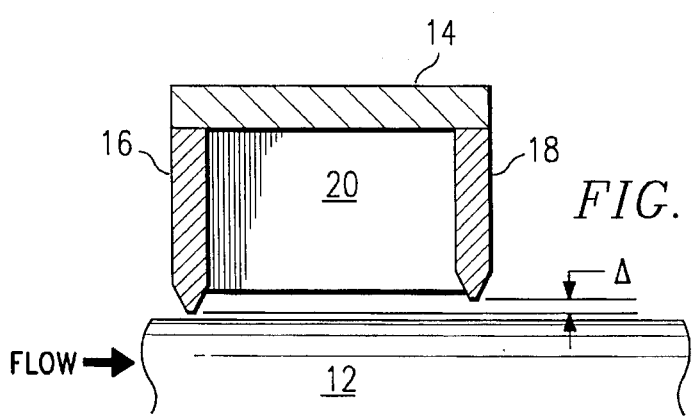
FIG. 3 is an exploded schematic representation of a portion of the damper seal shown in FIG. 2B.
Figure 4:
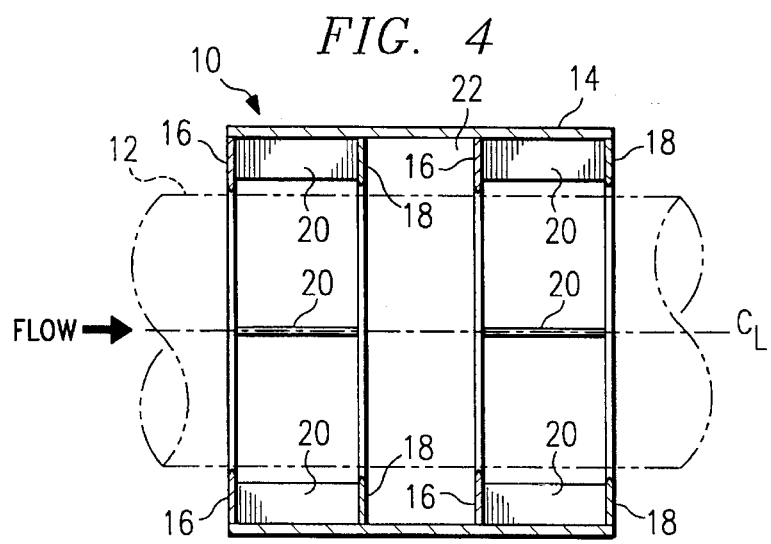
FIG. 4 is a longitudinal section of one embodiment of the present invention taken just off the center of the longitudinal axis of the shaft and stator housing.

Referring now to FIG. 4, there is shown a second embodiment of the present invention. The stator housing 14 has two pairs of sealing blades 16 and 18 attached to it. Each pair of sealing blades 16 and 18 is arranged similarly to those shown in FIG. 2B, but are separated by an annular cavity 22. Upstream sealing blades 16 have a smaller clearance relative to the shaft 12 than do downstream sealing blades 18. Additional pairs of sealing blades 16 and 18 separated by a non-partitioned cavity 22 may be attached to the stator housing in a like manner to form various embodiments of present invention; for example, a damper seal 10 could be formed with three pairs of sealing blades 16 and 18. Traditional labyrinth components could be placed in cavity 22 to further enhance sealing. This embodiment operates in a similar manner as shown in FIGS. 1–3, but provides improved sealing and damping in some environments.

Figure 5:
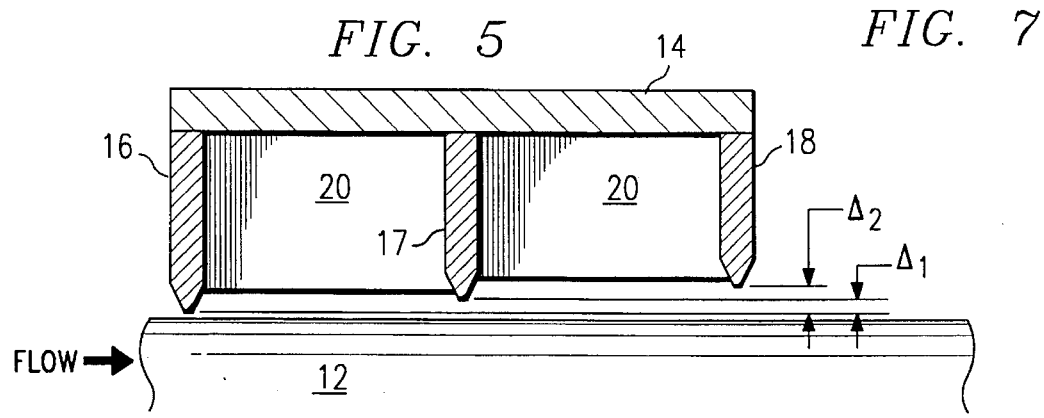
FIG. 5 is a schematic representation of a portion of one embodiment of the damper seal showing the clearances of adjacent sealing blades.

FIG. 5 is a schematic view of a section of a third embodiment of the damper seal 10 taken about the longitudinal axis. This embodiment illustrates the addition of sealing blades in larger groups. For example a damper seal 10 could be formed by securing three sealing blades 16, 17, and 18 to a stator housing 14 wherein the clearance between each sealing blade and the shaft 12 increases along the flow path, i.e., $\Delta_2 > \Delta_1$. This embodiment operates in a similar manner as shown in FIGS. 1–3, i.e., other components, e.g., partitioning walls 20, are included in the same manner as shown in FIGS. 1–3.

Figure 6:
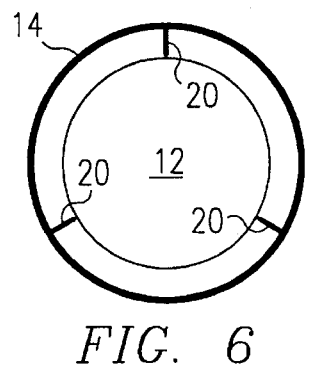
FIG. 6 is a radial section of one embodiment of the present invention.
Figure 7:
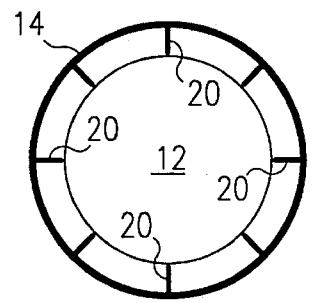
FIG. 7 is a radial section of one embodiment of the present invention.

Referring now to FIGS. 6 and 7, two different radial sections of the damper seal 10 are shown. The sectional views show that the number of partitioning walls 20 may be varied. In the embodiments shown, the partitioning walls 20 are evenly spaced about the inner circumference of the stator housing 14, but designs with unevenly spaced partitioning walls 20 are desirable in some situations depending on the characteristics of the rotating shaft 12.

Mathematical modeling of the present invention has indicated that the configuration will vary according to the specific application. Thus the number of partitioning walls 20, the difference in clearances between the upstream sealing edge 16 and the downstream sealing edge 18 relative to the shaft 12, the number of sealing blades, the total length of the damper seal 10, the pressure differential involved, and the frequency involved are all variables that are factored into the determination of the optimum configuration for each damper seal 10. Mathematical modeling has indicated that the present invention offers great improvements over conventional damper seals. Furthermore, as shown in FIG. 8, the empirical data shows that the present invention is superior to conventional labyrinth seals.

Figure 8:
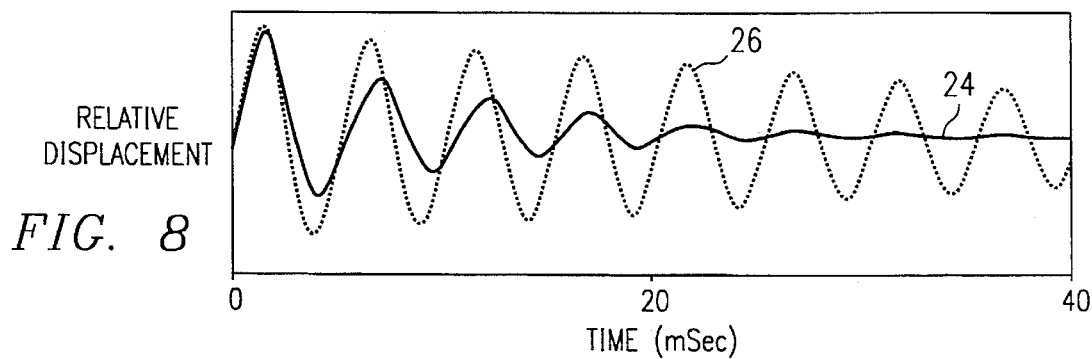
FIG. 8 is a graphical representation of empirical data collected in laboratory tests comparing the performance of one embodiment of the present invention to a labyrinth seal in terms of damping of an induced vibration at 200 Hz.

FIG. 8 is a graphical representation of empirical data taken in laboratory tests of the first embodiment of the present invention, which is shown in FIGS. 1–3, relative to the performance of a typical labyrinth seal. The experiment measured the damping of the damper seal 10 and the damping of the typical labyrinth seal for an induced, free vibration at 200 Hz, a typical vibratory frequency for many rotating machines. The embodiment tested had a shaft diameter of approximately 100 mm (3.94") and a sealing blade pitch of approximately 15.24 mm (0.6"). The sealing blades were attached to the stator housing such that the clearance between the upstream sealing blade and the shaft was approximately 0.076 mm (0.003") and the clearance between the downstream sealing blade and the shaft was approximately 0.152 mm (0.006"). The embodiment tested had four evenly spaced partitioning walls. The labyrinth seal that was tested for comparison purposes was a two-blade seal with a continuous annular cavity between the blades and otherwise had dimensions consistent with the tested embodiment.

The data for the embodiment of the present invention is represented by line 24, and the data developed under the same conditions for a typical labyrinth seal is depicted by line 26. The horizontal axis of FIG. 8 represents elapsed time, and the vertical axis of FIG. 8 represents relative displacement of the shaft 12. As the graph shows, the embodiment of the present invention quickly dampened the vibration of the shaft (line 24) as compared to the damping of the shaft by the traditional labyrinth seal (line 26).

The present invention has been described for a rotating shaft, but the invention is also applicable to a stationary shaft and a rotating housing. Thus, the damper seal 10 may be applied generally with a rotating structural member, which may be a shaft or a housing; however, if the housing is rotating, the embodiment would have the blades and partitioning walls mounted on the shaft.

Although the present invention has been described in detail, it should be understood that various changes, substitutions and alterations can be made herein without departing from the spirit and scope of the invention as defined by the appended claims.

What is claimed is:

1. Apparatus for maintaining a fluid barrier between areas along a rotating shaft and for damping vibratory motion of the shaft comprising:

a stator housing enclosing the area of the shaft to be sealed and allowing the shaft to rotatably pass through said stator housing;

a plurality of sealing blades each having an edge, said plurality of sealing blades coupled to said stator housing so that clearances between the edges of said plurality of sealing blades and said shaft increase along a flow path of the fluid; and a plurality of partitioning walls, said partitioning walls attached to said plurality of sealing blades and said stator housing to form a plurality of fluid cavities.

2. The apparatus of claim 1, wherein said plurality of partitioning walls are attached longitudinally to said stator housing and attached perpendicularly to said sealing blades and wherein the plurality of partitioning walls are symmetrically disposed about the shaft.

3. An apparatus for maintaining a fluid pressure differential along a rotating shaft and for damping vibratory motion of said shaft comprising:

a stator housing enclosing the area of the shaft to be sealed and allowing said shaft to rotatably pass through said stator housing;

a plurality of sealing blades, each of said plurality of sealing blades having a predetermined clearance between said shaft and said sealing blade;

said predetermined clearances increasing in size along a flow path of the fluid;

means for suspending said plurality of sealing blades relative to said shaft with said predetermined clearances;

a plurality of partitioning walls, each partitioning wall having a longitudinal edge, a first end, and a second end, the longitudinal edge of each partitioning wall attached to said stator housing, the first end and second end of each partitioning wall attached to adjacent sealing blades to form a plurality of fluid cavities formed with one opening adjacent the rotating shaft.

4. The apparatus of claim 3, wherein said means for suspending said plurality of sealing blades comprises a welded connection between said sealing blades and said stator housing.

5. An apparatus for restricting fluid flow between areas along a rotating shaft at different pressures and damping vibratory motion of said shaft comprising:

a stator housing with the shaft disposed therein;

a plurality of sealing blades, each sealing blade having an edge and coupled to said stator housing so that each of said edges of said plurality of sealing blades is suspended relative to said shaft with a predetermined clearance therebetween, and wherein the predetermined clearance of at least one of said plurality of sealing blades is greater than the predetermined clearance of other sealing blades in said plurality of sealing blades upstream to the at least one sealing blade; and a plurality of partitioning walls disposed between said plurality of sealing blades and attached to the stator housing and sealing blades to form a plurality of cavities therein, each cavity formed to have only one opening adjacent the rotating shaft.

6. The apparatus of claim 5, wherein said stator housing comprises an annular-shaped housing that allows said shaft to pass therethrough and wherein the plurality of partitioning walls comprises four symmetrically spaced partitioning walls.

7. The apparatus of claim 5, wherein said plurality of sealing blades comprises pairs of sealing blades laterally disposed around said shaft.

8. The apparatus of claim 7, wherein each of said pairs of sealing blades has an upstream and a downstream sealing blade relative to fluid flow of said fluid and wherein for each said pairs of sealing blades, said predetermined clearance for said upstream sealing blade is smaller than said predetermined clearance for said downstream sealing blade.

9. The apparatus of claim 7, wherein at least three partitioning walls of said plurality of partitioning walls are coupled to each pair of sealing blades by longitudinally attaching said walls to the stator housing between said sealing blades of each pair of sealing blades and wherein the plurality of partitioning walls are symmetrically spaced around the rotating shaft.

10. The apparatus of claim 5, wherein said plurality of partitioning walls are attached between said sealing blades.

11. An apparatus for damping whirl along a rotating shaft that has fluid flow about a longitudinal axis of the shaft, the apparatus comprising:

a stator housing disposed about the exterior of the shaft;

a plurality of sealing blades grouped in pairs, each of said pairs of said plurality of sealing blades having an upstream and a downstream sealing blade relative to the flow direction of said fluid and each having an edge;

said plurality of sealing blades attached to said stator housing so that each of said plurality of sealing blades has a predetermined clearance between said shaft and said edge of said sealing blade;

a plurality of partitioning walls associated with each of said pairs of said sealing blades, each of said plurality of partitioning walls having a first and a second end, said first end of said partitioning walls attached to said upstream sealing blade and said second end of said partitioning walls attached to said downstream sealing blade; and wherein said predetermined clearance for said upstream sealing blade is smaller than said predetermined clearance for said downstream sealing blade for each said pairs of sealing blades.

12. A method for sealing segments of a rotating shaft having fluid along the rotating shaft and having the fluid at different pressure levels along the shaft and for damping the vibratory motion of said rotating shaft, the method comprising the steps of:

positioning a housing around a portion of said rotating shaft;

attaching a plurality of sealing blades grouped in pairs to said housing, said plurality of sealing blades attached so that each sealing blade has a predetermined clearance between said sealing blade and said shaft, said pairs of sealing blades having an upstream and a downstream sealing blade;

sizing said predetermined clearance of said upstream sealing blade to be smaller than said predetermined clearance of said downstream sealing blade for each pair of said plurality of sealing blades; and attaching a plurality of partitioning walls between said pair of sealing blades and to said housing to form a plurality of fluid cavities having one opening adjacent to the rotating shaft.

13. The method of claim 12, wherein the step of attaching a plurality of partitioning walls to said pair of sealing blades further comprises attaching a first end of said partitioning wall to said upstream sealing blade and attaching a second end of said partitioning wall to said downstream sealing blade.

14. The method of claim 12, wherein the step of attaching a plurality of partitioning walls further comprises attaching the partitioning walls in an evenly spaced manner with respect to the shaft.

15. Apparatus for sealing fluid flow about a rotating shaft and for damping vibratory motion of the shaft, the apparatus comprising:

an annular stator housing formed to allow said rotating shaft to pass through the center thereof;

a first and a second sealing blade, said first and said second sealing blades attached to said stator housing with said first sealing blade having a first predetermined clearance between said first sealing blade and said shaft and said second sealing blade having a second predetermined clearance between said shaft and said second sealing blade;

said first sealing blade attached to said stator housing upstream of said second sealing blade;

said second predetermined clearance of said second sealing blade greater than said first predetermined clearance of said first sealing blade;

a plurality of partitioning walls, each of said partitioning walls having a first and a second end and a longitudinal edge, said first end attached to said first sealing blade, said second end attached to said second sealing blade, said longitudinal edge attached to the stator housing to form a plurality of fluid cavities having an opening adjacent to the rotating shaft.

16. A method for sealing the flow of a fluid about a given section of a rotating shaft and for damping the vibratory motion of said shaft comprising the steps of:

providing a stator housing that allows said rotating shaft to pass through said stator housing;

attaching a first sealing blade on an upstream end of said stator housing so that said first sealing blade is positioned relative to said shaft with a first predetermined radial clearance between said shaft and said first sealing blade;

attaching a second sealing blade on a downstream end of said stator housing so that said second sealing blade is positioned relative to said rotating shaft with a second predetermined radial clearance between said rotating shaft and said second sealing blade;

sizing said first and said second predetermined clearances so that said second predetermined clearance is greater than said first predetermined clearance; and attaching a plurality of symmetrically spaced partitioning walls to said stator housing and to said first and said second sealing blades to form a plurality of cavities.

17. An apparatus for restricting fluid flow between areas along a rotating shaft at different pressures and damping vibratory motion of said shaft comprising:

a stator housing with said shaft disposed therein;

a plurality of sealing blades associated with said stator housing so that each of said blades is suspended relative to said shaft with a predetermined clearance therebetween, said plurality of sealing blades comprising pairs of sealing blades laterally disposed around said shaft, each pair of sealing blades having an upstream and a downstream sealing blade relative to the flow of said fluid and said predetermined clearance for said downstream sealing blade being approximately twice said predetermined clearance for said upstream sealing blade; and a plurality of partitioning walls disposed between said sealing blades of each pair of sealing blades to form cavities therein.

* * * * *

UNITED STATES PATENT AND TRADEMARK OFFICE
CERTIFICATE OF CORRECTION

PATENT NO. : 5,540,447
DATED : July 30, 1996
INVENTOR(S) : Shultz, et al.

It is certified that error appears in the above-indentified patent and that said Letters Patent is hereby corrected as shown below:

Column 4, line 47, after "by", delete "a", and insert -- $\Delta$ --.

Column 5, line 18, after "clearances," delete "a" and insert -- $\Delta$ --.

Signed and Sealed this

Twenty-fourth Day of December, 1996

Attest:

BRUCE LEHMAN

*Attesting Officer*  *Commissioner of Patents and Trademarks*